(12) United States Patent
Van Den Brink et al.

(10) Patent No.: US 7,331,627 B2
(45) Date of Patent: Feb. 19, 2008

(54) LATERAL CONTROL ROD FOR A CAB SUSPENSION SYSTEM

(76) Inventors: Joel Dean Van Den Brink, 2877 120th St., Rock Rapids, IA (US) 51246; Gregory W. Hulstein, 316 6th Ave. SE., Sioux Center, IA (US) 51250

( * ) Notice: Subject to any disclaimer, the term of this patent is extended or adjusted under 35 U.S.C. 154(b) by 241 days.

(21) Appl. No.: 11/132,585

(22) Filed: May 19, 2005

(65) Prior Publication Data
US 2007/0267894 A1 Nov. 22, 2007

(51) Int. Cl.
*B62D 33/10* (2006.01)

(52) U.S. Cl. .............. 296/190.07; 180/89.13; 248/581; 267/201; 267/140.11

(58) Field of Classification Search ........... 296/190.05, 296/190.04, 190.07, 1.03; 180/89.13, 89.14, 180/89.18, 89.19; 188/129; 248/562, 560, 248/613, 581; 267/203, 201, 291, 292, 293, 267/294, 140.11, 140.13
See application file for complete search history.

(56) References Cited

U.S. PATENT DOCUMENTS

| | | | | |
|---|---|---|---|---|
| 1,713,515 A * | 5/1929 | Bechereau | .................... | 188/129 |
| 2,099,807 A * | 11/1937 | Gregory | .............. | 280/124.127 |
| 2,421,822 A * | 6/1947 | Wood | .......................... | 248/543 |
| 2,427,427 A * | 9/1947 | Tykeson | ...................... | 188/129 |
| 2,574,420 A * | 11/1951 | Seddon | ........................ | 267/293 |
| 2,639,141 A * | 5/1953 | Gabriel | ........................ | 267/293 |
| 2,705,634 A * | 4/1955 | Sampson et al. | ............ | 267/203 |
| 3,053,526 A * | 9/1962 | Kendall | ........................ | 267/134 |
| 3,129,973 A | 4/1964 | Maruhn | ......................... | 296/35 |
| 3,393,005 A | 7/1968 | Herrmann et al. | ............ | 296/28 |
| 3,508,784 A | 4/1970 | Small | ............................ | 296/35 |
| 3,847,492 A | 11/1974 | Kennicutt et al. | .......... | 403/224 |
| 3,904,226 A * | 9/1975 | Smalley | ........................ | 280/486 |
| 4,438,970 A | 3/1984 | Boucher | ....................... | 296/190 |
| 4,862,983 A * | 9/1989 | Kreft | .......................... | 180/89.13 |
| 5,375,823 A * | 12/1994 | Navas | ....................... | 623/17.15 |
| 5,433,423 A * | 7/1995 | Whightsil, Sr. | ........... | 267/141.1 |
| 5,456,454 A * | 10/1995 | Schulz et al. | ............... | 267/293 |
| 5,553,911 A | 9/1996 | Bodin et al. | ................. | 296/190 |
| 6,397,985 B2 * | 6/2002 | Wiebe | ......................... | 188/129 |
| 6,443,437 B1 * | 9/2002 | Beyene et al. | ............ | 267/64.26 |
| 6,471,198 B2 * | 10/2002 | Herbst | ......................... | 267/293 |
| 6,540,038 B2 | 4/2003 | Taylor et al. | ............. | 180/89.13 |
| 6,758,294 B2 | 7/2004 | Peddycord et al. | ....... | 180/89.12 |
| 7,070,157 B2 * | 7/2006 | Huprikar et al. | ............ | 248/636 |

* cited by examiner

*Primary Examiner*—Jason S Morrow
(74) *Attorney, Agent, or Firm*—Dennis L. Thomte; Thomte Law Office LLC

(57) ABSTRACT

A lateral control rod for use in a vehicle cab suspension wherein the control rod has an attenuation assembly imposed therein between the ends thereof which reduces the transmission of vibration and shock therethrough.

12 Claims, 3 Drawing Sheets

LATERAL CONTROL ROD FOR A CAB SUSPENSION SYSTEM

BACKGROUND OF THE INVENTION

1. Field of the Invention

This invention relates to a lateral control rod and more particularly to a lateral control rod for use in a cab suspension system. More particularly, the lateral control rod of this invention includes an attenuation assembly imposed therein intermediate the length thereof which reduces the transmission of vibration and shock through the lateral control rod and which also yieldably centers the cab into its neutral position.

2. Description of the Related Art

Many vehicle cab suspensions have been previously provided for supporting a vehicle cab on the chassis of the vehicle whereby a cushioning or shock absorber effect is achieved to provide a more comfortable ride for the occupant or occupants of the cab. For example, see U.S. Pat. No. 6,540,038 wherein a vehicle cab suspension system is disclosed including a pair of airbags or air springs which are positioned between the rear of the cab and truck frame with the airbags being inflatably adjustable to exert an upward force against the underside of the cab. Cab suspensions have also been developed which include cab springs and dampers located between the vehicle frame and the operator's cab to minimize transmission of shock and vibration to the cab. Several types of cab suspensions have utilized a lateral control rod or lateral shock absorbers to control lateral movement of the cab with respect to the frame. For example, see U.S. Pat. No. 6,758,294. Although the devices of the prior art have met with some success, it is believed that devices such as that disclosed in U.S. Pat. No. 6,758,294 do not provide the necessary lateral control while minimizing the transmission of vibration and shock from the vehicle frame into the operator's cab.

SUMMARY OF THE INVENTION

A lateral control rod is provided for use in a vehicle cab suspension system with the vehicle including a frame and a cab having a rear end which is movably mounted with respect to the frame. The lateral control rod of this invention includes an elongated tube having first and second ends with the first end of the tube being adapted to be pivotally secured to one of the frame or the cab at the rear end thereof. The lateral control rod of this invention also includes an elongated rod having first and second ends with the first end of the rod being adapted to be pivotally secured to the other of the frame or the cab at the rear end thereof. The second end of the rod is longitudinally movably received by the second end of the tube. An attenuation assembly is positioned between the tube and the second rod to reduce the transmission of vibration and shock through the lateral control rod and which also yieldably centers the cab into its neutral position. The attenuation assembly of this invention comprises first and second opposing resilient members such as rubber or elastomeric type members, plastic or metal springs, etc. The resilient members are enclosed within an elongated housing or tube having first and second ends. The first end of the housing is fixed to the second end of the tube with the second end of the housing slidably receiving the second end of the rod. A compression plate is secured to the rod and is positioned within the housing. The first resilient member is positioned between the compression plate and the first end of the housing. The second resilient member is positioned between the compression plate and the second end of the housing. When the rod is slidably moved towards the tube, the second resilient member is compressed. When the rod is slidably moved away from the tube, the first resilient member is compressed. The opposing resilient members not only attenuate (lessen) the transmission of vibration and shock through the control rod, but also yieldably urge the cab into its neutral position.

It is therefore a principal object of the invention to provide an improved lateral control rod for use in a vehicle cab suspension system.

Yet another object of the invention is to provide a lateral control rod which includes an attenuation assembly associated therewith which reduces shock or vibration transmitted therethrough.

Yet another object of the invention is to provide an improved lateral control rod including an attenuation assembly provided thereon which is economical of manufacture, durable in use and refined in appearance.

These and other objects will be apparent to those skilled in the art.

DETAILED DESCRIPTION OF THE INVENTION

Figure 1:
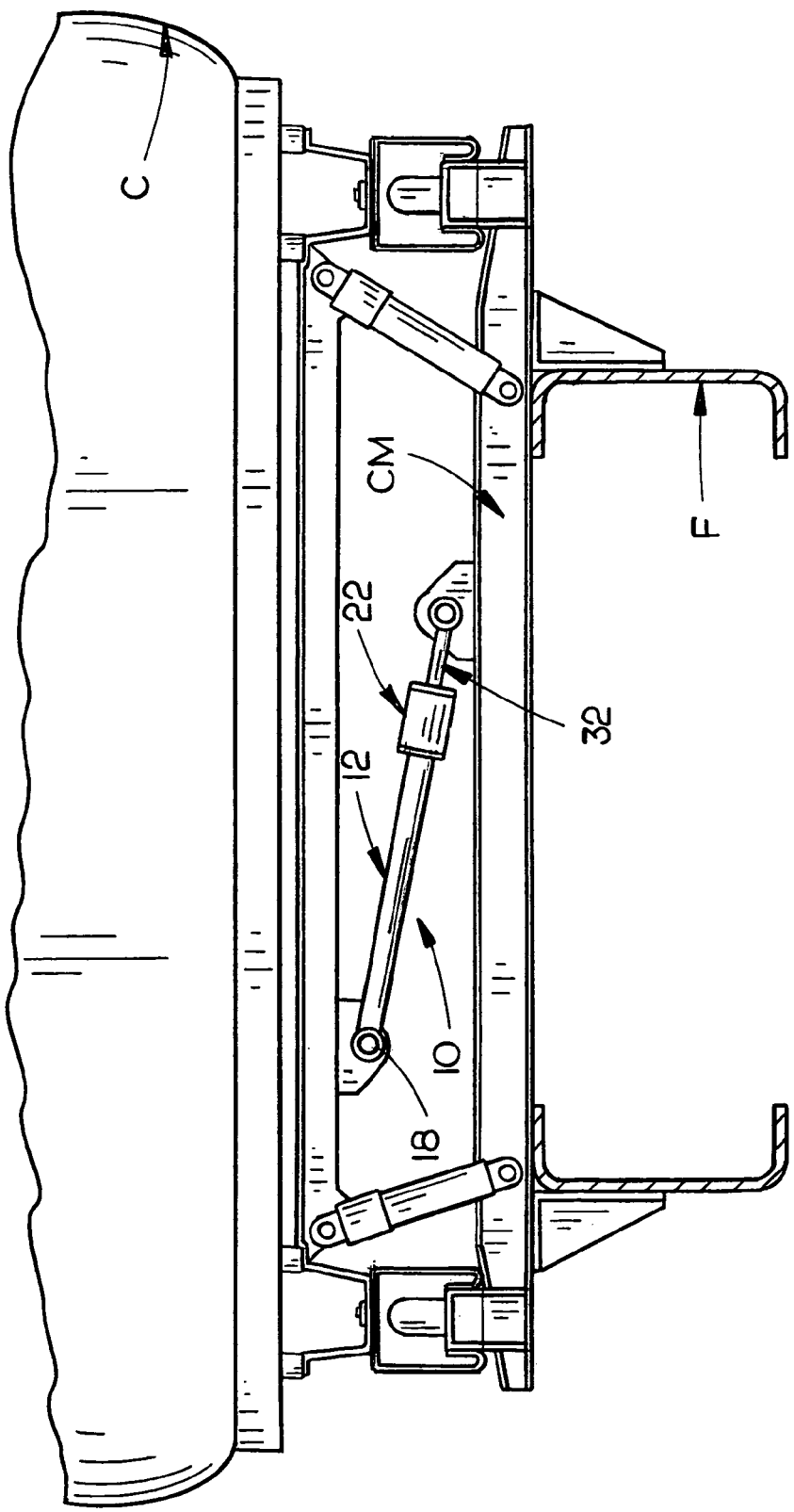
FIG. 1 is a rear view of a typical prior art vehicle cab suspension system which has the lateral control rod of this invention associated therewith.

The lateral control rod of this invention is referred to generally by the reference numeral 10 and is designed to be used in cab suspension systems such as disclosed in U.S. Pat. No. 6,758,294 and as partially depicted in FIG. 1. In the '294 patent, a pan hard rod 30 is provided to resist or control lateral movement of the cab with respect to the frame. The instant invention is designed to replace such lateral control rods as well as other types of lateral control rods.

Lateral control rod 10 includes an elongated tube 12 having a first end 14 and a second end 16. A transversely disposed collar 18 is secured to end 14 of tube 12 and has a bushing 20 positioned therein in conventional fashion. The collar 18 and bushing 20 may be secured to either the rear of the vehicle cab C or to cross-member CM of the vehicle frame F although collar 18 and bushing 20 will normally be secured to the cab. The numeral 22 refers to a tubular housing having a first end 24 and a second end 26. The numeral 28 refers to an end cap having a central bore or opening 29 formed therein which receives the second end 16 of tube 12 with the end cap 28 being welded to tube 12. End cap 28 closes the end 24 of housing 22 and is secured to housing 22 by welding, press-fitting, crimping or the like.

Housing 22 has a larger diameter than tube 12 and extends therefrom in a parallel relationship thereto, as seen in the drawings. A plastic or metal bearing or bushing 30 is received in the central opening or bore 29 of end cap 28 and is preferably press-fitted thereinto.

Lateral control rod 10 also includes an elongated rod 32 having a first end 34 and a second end 36. Transversely extending collar 38 is secured to end 34 of rod 32 and has a resilient bushing 40 positioned therein. Collar 38 and bushing 40 are secured to either the vehicle cab or the vehicle frame although collar 38 and bushing 40 will normally be connected to the vehicle frame if collar 18 and bushing 20 are connected to the vehicle cab. Rod 32 is provided with spaced-apart annular grooves 42 and 44 formed in the exterior surface thereof which are adapted to receive snap rings 46 and 48 therein, respectively.

Lateral control rod 10 also includes a compression plate 50 having a central bore 52 formed therein. Plate 50 is positioned on rod 32 between annular grooves 42 and 44 and is maintained thereon by the snap rings 46 and 48 positioned at the opposite sides thereof. A resilient member 54 comprised of rubber, elastomer, etc., has a central bore 56 which receives rod 32 and which is positioned at one side of compression plate 50. Member 54 is generally cylindrical in shape but which preferably has an enlarged diameter portion 58 at its center length. A resilient member 60 comprised of rubber, elastomer, etc., has a central bore 62 which receives rod 32 and which is positioned at the other side of compression plate 50. Resilient member 60 is identical to resilient member 54 and has an enlarged diameter position 61 at its center length. Although resilient members 54 and 60 will be identical and will have identical spring rates, one of the resilient members may have a greater spring rate than the other resilient member to offer more resistance in one direction. The resilient members 54 and 56 may be replaced by metal or plastic springs if so desired although it is preferred that rubber or elastomeric type members such as shown be utilized.

Figures 2, 3:
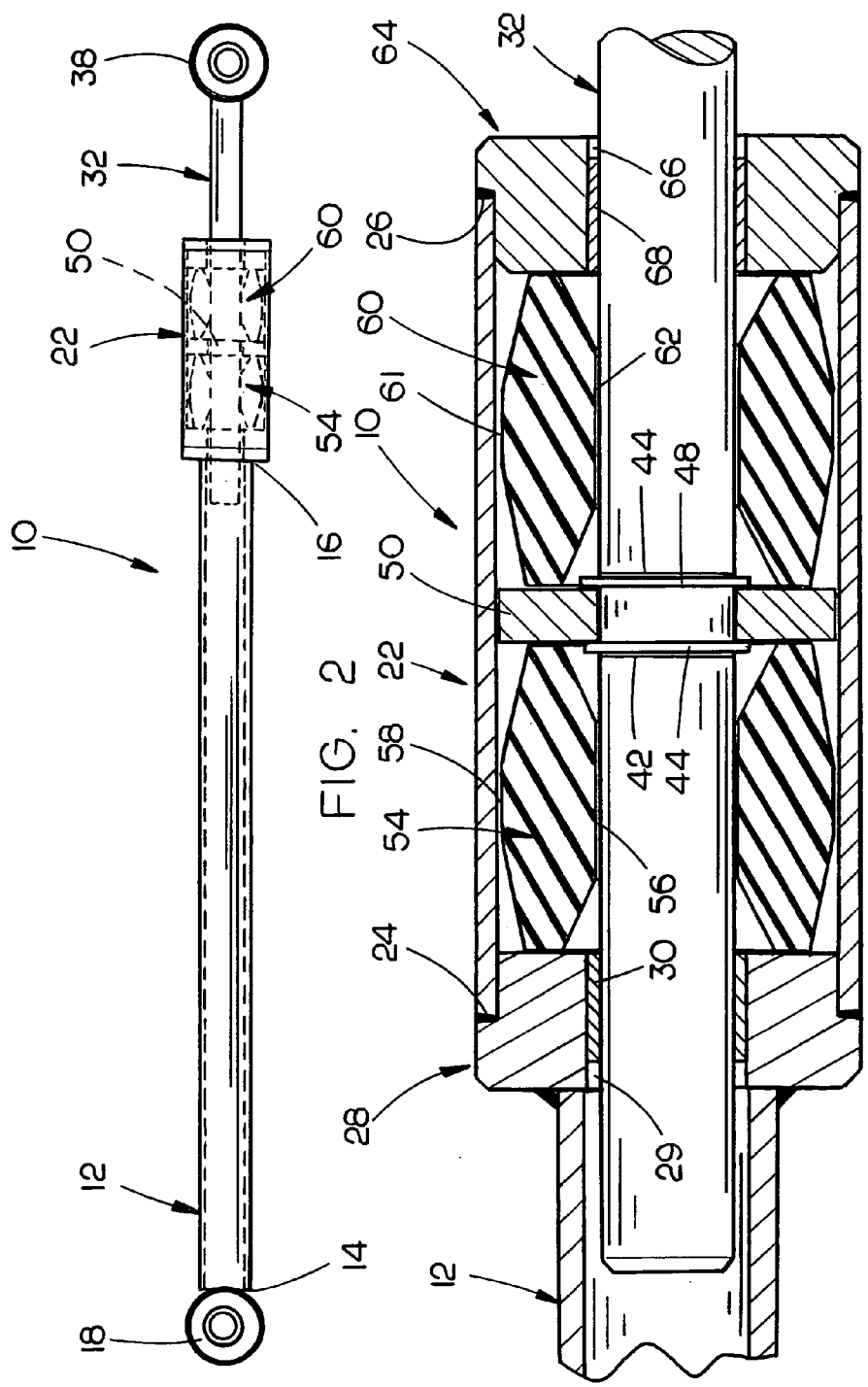
FIG. 2 is an elevational view of the lateral control rod of this invention.
FIG. 3 is a sectional view of the dampener assembly of the lateral control rod of this invention.
Figure 4:
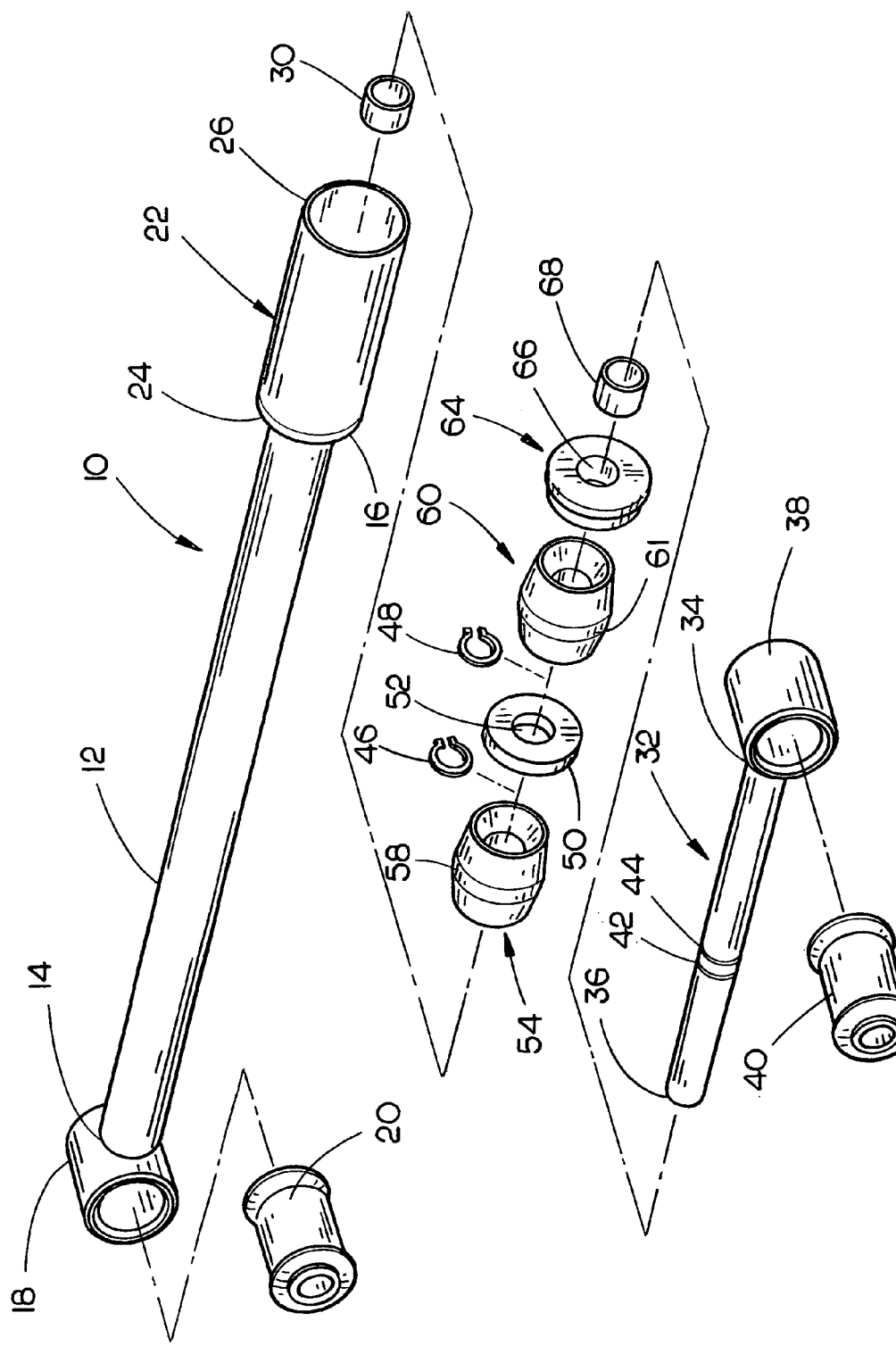
FIG. 4 is an exploded perspective view of the lateral control rod of this invention.

Lateral control rod 10 also includes an end cap 64 having a central bore 66 formed therein which has a plastic or metal bearing or bushing 68 received therein. Bushings 68 and 30 movably receive rod 32, as seen in FIG. 3. End cap 64 closes end 26 of housing 22 and is secured thereto by welding, press-fitting, crimping, etc.

When rod 32 is moved towards tube 12, with the cab in its neutral position, resilient member 54 is compressed between compression plate 50 and end cap 28. When rod 32 is moved away from tube 12, with the cab in its neutral position, resilient member 60 is compressed between compression plate 50 and end cap 64. The resilient members 58 and 60 function as a two-way attenuation assembly imposed between rod 32 and tube 12 which reduces shock forces and vibrations being transmitted from the vehicle frame to the vehicle cab. The lateral control rod is readily adaptable to be installed in new cab suspension systems but also may replace a lateral control rod in existing systems with a minimum amount of time and labor being required.

Thus it can be seen that the invention accomplishes at least all of its stated objectives.

We claim:

1. A lateral control rod for use in a vehicle cab suspension system with the vehicle including a frame and a cab having a rear end which is movably mounted with respect to the frame, comprising:
    an elongated tube having first and second ends;
    said first end of said tube being adapted to be secured to one of the frame or the cab at the rear end thereof;
    a tubular housing having first and second ends;
    said first end of said housing being secured to said tube at said second end thereof so that said housing extends from said tube parallel to said tube;
    an elongated rod having first and second ends;
    said first end of said rod being adapted to be secured to the other of the frame or the cab at the rear end thereof;
    said second end of said rod movably extending inwardly through said housing and being longitudinally movably received by said second end of said tube;
    a compression plate, having first and second sides, movably positioned within said housing and being secured to said rod for movement therewith;
    a first resilient member positioned between said first side of said compression plate and said first end of said housing;
    a second resilient member positioned between said second side of said compression plate and said second end of said housing;
    said second end of said rod extending through said compression plate;
    the movement of said rod towards said tube causing said first resilient member to be to be compressed.

2. A lateral control rod for use in a vehicle cab suspension system with the vehicle including a frame and a cab having a rear end which is movably mounted with respect to the frame, comprising:
    an elongated tube having first and second ends;
    said first end of said tube being adapted to be secured to one of the frame or the cab at the rear end thereof;
    an elongated rod having first and second ends;
    said first end of said rod being adapted to be secured to the other of the frame or the cab at the rear end thereof;
    a cylindrical, hollow housing having first and second ends;
    said first end of said housing being secured to said tube at said second end thereof so that said housing extends from said tube parallel to said tube;
    said second end of said rod movably extending through said second end of said housing and into said second end of said tube; and
    a two-way attenuation assembly positioned in said housing which is operatively coupled to said rod to yieldably resist the inward movement of said rod with respect to said tube and to yieldably resist the outward movement of said rod with respect to said tube;
    a compression plate, having opposite sides, secured to said rod within said housing for movement therewith;
    a first resilient member embracing said rod between one side of said compression plate and said first end of said housing; and
    a second resilient member embracing said rod between the other side of said compression plate and said second end of said housing.

3. A lateral control rod for use in a vehicle cab suspension system with the vehicle including a frame and a cab having a rear end which is movably mounted with respect to the frame, comprising:
    an elongated tube having first and second ends;
    said first end of said tube being adapted to be secured to one of the frame or the cab at the rear end thereof;
    an elongated rod having first and second ends;
    said first end of said rod being adapted to be secured to the other of the frame or the cab at the rear end thereof;
    a cylindrical, hollow housing having first and second ends;
    said first end of said housing being secured to said tube at said second end thereof so that said housing extends from said tube parallel to said tube;
    said second end of said rod movably extending through said second end of said housing and into said second end of said tube; and
    a two-way attenuation assembly positioned in said housing which is operatively coupled to said rod to yieldably resist the inward movement of said rod with respect to said tube and to yieldably resist the outward movement of said rod with respect to said tube;

a first end cap secured to said second end of said tube which has a central opening formed therein for slidably receiving said second end of rod;

a second end cap spaced from said first end cap which has a central opening formed therein which slidably receives said rod; and a housing member secured to said first and second end caps and extending therebetween.

4. The lateral control rod of claim 1 wherein a first end cap secures said first end of said housing to said tube.

5. The lateral control rod of claim 4 wherein a second end cap is secured to said second end of said housing with said rod movably extending through said second end cap.

6. The lateral control rod of claim 1 wherein said first end of said tube has a transversely extending collar secured thereto which has a resilient bushing positioned therein.

7. The lateral control rod of claim 6 wherein said first end of said rod has a transversely extending collar secured thereto which has a resilient bushing positioned therein.

8. The lateral control rod of claim 1 wherein each of said first and second resilient members are generally cylindrical in shape and have opposite ends and center portions with the center portions thereof having a greater diameter than the ends thereof.

9. The lateral control rod of claim 1 wherein said rod movably extends through said resilient members.

10. The lateral control rod of claim 1 wherein said rod has a pair of spaced-apart annular grooves formed therein, said compression plate being positioned on said rod between said pair of annular grooves, and wherein a snap ring is positioned in each of said spaced-apart annular grooves to secure said compression plate to said rod.

11. The lateral control rod of claim 2 wherein each of said first and second resilient members are generally cylindrical in shape and have opposite ends and center portions with the center portions thereof having a greater diameter than the ends thereof.

12. The lateral control rod of claim 3 wherein said rod has a pair of spaced-apart annular grooves formed therein, said compression plate being positioned on said rod between said pair of annular grooves, and wherein a snap ring is positioned in each of said spaced-apart annular grooves to secure said compression plate to said rod.

* * * * *